(12) United States Patent
Lee et al.

(10) Patent No.: US 9,858,445 B2
(45) Date of Patent: Jan. 2, 2018

(54) MOBILE TERMINAL PROVIDED WITH SECURITY FUNCTION

(75) Inventors: Jang Won Lee, Seoul (KR); Jae In Ko, Seoul (KR); Chan Woong Park, Seoul (KR)

(73) Assignee: BLUEBIRD INC. (KR)

( * ) Notice: Subject to any disclaimer, the term of this patent is extended or adjusted under 35 U.S.C. 154(b) by 93 days.

(21) Appl. No.: 14/425,001

(22) PCT Filed: Aug. 31, 2012

(86) PCT No.: PCT/KR2012/006998
§ 371 (c)(1),
(2), (4) Date: Feb. 27, 2015

(87) PCT Pub. No.: WO2014/034982
PCT Pub. Date: Mar. 6, 2014

(65) Prior Publication Data
US 2015/0208527 A1    Jul. 23, 2015

(51) Int. Cl.
*G06F 21/86* (2013.01)
*H05K 5/02* (2006.01)
(Continued)

(52) U.S. Cl.
CPC .............. *G06F 21/86* (2013.01); *H04L 9/002* (2013.01); *H04M 1/0202* (2013.01);
(Continued)

(58) Field of Classification Search
CPC .. G06F 21/86; G06F 21/70; G06F 2221/2143; H05K 5/0208
See application file for complete search history.

(56) References Cited

U.S. PATENT DOCUMENTS 5,159,629 A * 10/1992 Double ................... G06F 21/87
                                                           206/807
5,705,981 A *  1/1998 Goldman ............... G08B 13/08
                                                           340/541
(Continued)

FOREIGN PATENT DOCUMENTS

EP          0417447 B1   3/1991
JP        2003208576 A   7/2003
(Continued)

*Primary Examiner* — Zachary A Davis
(74) *Attorney, Agent, or Firm* — Renaissance IP Law Group LLP

(57) ABSTRACT

Disclosed is a mobile terminal provided with a security function. The mobile terminal provided with the security function can include: a casing having a data input portion for inputting data, and an upper casing and a lower casing which can be assembled and disassembled; a circuit board for processing input data, which is electrically connected to the data input portion and is provided with a security unit that requires security; a tamper prevention conductive portion which is arranged between the casing and the circuit board and is electrically connected to the circuit board when the upper casing and the lower casing are assembled; and a control portion for denying access to data in the security unit based on a resistance value of the tamper prevention conductive portion. As a result, access to data in a secure region to which important data is saved is denied when the casing is forcibly opened, thereby effectively preventing important data from being leaked to the outside.

14 Claims, 3 Drawing Sheets

(51) Int. Cl.
   *H04M 1/02*   (2006.01)
   *H04L 9/00*   (2006.01)
   *H05K 5/00*   (2006.01)
   *H05K 1/02*   (2006.01)
   *H04W 12/12*   (2009.01)
   *H04W 88/02*   (2009.01)

(52) U.S. Cl.
   CPC ......... *H05K 5/0004* (2013.01); *H05K 5/0208* (2013.01); *G06F 2221/2143* (2013.01); *H04L 2209/80* (2013.01); *H04W 12/12* (2013.01); *H04W 88/02* (2013.01); *H05K 1/0275* (2013.01)

(56) References Cited

U.S. PATENT DOCUMENTS

| | | | |
|---|---|---|---|
| 5,889,463 A * | 3/1999 | Judd | B60R 25/1001 340/425.5 |
| 7,238,901 B2 * | 7/2007 | Kim | G07F 7/10 200/341 |
| 8,522,051 B2 * | 8/2013 | Hankhofer | H05K 5/0208 29/846 |
| 8,595,514 B2 * | 11/2013 | Mirkazemi-Moud | G06F 1/1626 340/539.1 |
| 9,009,860 B2 * | 4/2015 | Klum | G06F 21/86 702/138 |
| 2009/0106563 A1 * | 4/2009 | Cherpantier | G06F 21/86 713/194 |
| 2012/0047374 A1 | 2/2012 | Klum et al. | |

FOREIGN PATENT DOCUMENTS

| | | |
|---|---|---|
| JP | 2008033593 A | 2/2008 |
| JP | 2008065401 A | 3/2008 |
| JP | 2008130737 A | 6/2008 |
| KR | 20090130046 A | 12/2009 |

\* cited by examiner

MOBILE TERMINAL PROVIDED WITH SECURITY FUNCTION

TECHNICAL FIELD

The present invention relates to a mobile terminal provided with a security function, and more particularly, to a mobile terminal provided with a security function to prevent access to data in a security region where important data is saved when a casing of the mobile terminal is forcibly opened.

BACKGROUND

In general, mobile terminals are a concept including mobile communication terminals, payment terminals, and various computers and tablet PCs for inputting and processing data.

In the following description, for convenience of explanation, a payment terminal is mainly discussed.

The payment terminal includes a central processing unit for processing input data and various types of memories for storing data.

Important information that is necessary to protect from being leaked to the outside may be processed by or stored in the central processing unit and the memory.

In the payment terminal, it is very important to prevent leakage of important data related to security stored in relation with card payments, personal authentication, personal information, and company secrets.

In other words, when a user who is not security-approved accesses a mobile terminal where important data is stored by opening a casing in order to leak the data to the outside, a serious security breach may occur.

To address the above problem, in the payment terminal according to a related art, when the casing of the payment terminal storing important data is opened, an anti-tampering protection member which may deny access to the important data is provided.

However, in the mobile terminal according to a related art, accessing to the important data may be denied only when the casing is opened. It is a demerit that, when opening the casing is tried, such a try may not be detected.

SUMMARY

The present invention provides a mobile terminal provided with a security function which may prevent leakage of important data by denying access to data in a security region when there is a possibility of leakage of the important data to the outside, for example, not only when both of an upper casing and a lower casing are opened, but also when opening of a casing is tried.

According to an aspect of the present inventive concept, there is provided a mobile terminal provided with a security function which includes a casing comprising a data input portion for inputting data and an upper casing and a lower casing which are capable of being assembled or disassembled with respect to each other, a circuit board for processing input data and comprising a security unit that is electrically connected to the data input portion and requiring security, an anti-tampering conduction portion arranged between the casing and the circuit board and electrically connected to the circuit board by being pressed when the upper casing and the lower casing are assembled to each other, and a control portion denying access to data of the security unit based on a resistance value of the anti-tampering conduction portion.

The anti-tampering conduction portion may be pressed by a coupling member that penetrates through the upper casing and the lower casing.

When a resistance value between the anti-tampering conduction portion and the circuit board is out of a preset range, the control portion may deny access to the data of the security unit.

When the resistance value between the anti-tampering conduction portion and the circuit board is infinite and the electric connection between the anti-tampering conduction portion and the circuit board is disconnected, the control portion may deny access to the data of the security unit.

The circuit board may include a lower circuit board arranged above the lower casing and an upper circuit board arranged above the lower circuit board and the anti-tampering conduction portion may be arranged between the upper circuit board and the lower circuit board and connected to at least one of the upper circuit board and the lower circuit board.

The mobile terminal provided with a security function may further include a security partition that is arranged between the upper circuit board and the lower circuit board to deny access to the data of the security unit from a side portion of the casing and connected to each of the upper circuit board and the lower circuit board, in which the anti-tampering conduction portion is electrically connected to the security partition.

An accommodation opening for accommodating the anti-tampering conduction portion may be formed in the security partition.

The anti-tampering conduction portion may be connected to each of the upper circuit board and the lower circuit board, the security partition may include a lower security partition connected to the lower circuit board and an upper security partition arranged above the lower security partition and connected to the upper circuit board, and the anti-tampering conduction portion may be electrically connected to at least one of the upper security partition and the lower security partition.

The security partition may include a lower security partition connected to the lower circuit board and an upper security partition arranged above the lower security partition and connected to the upper circuit board The anti-tampering conduction portion may include a plurality of anti-tampering prevention members separated from one another, and each of the plurality of anti-tampering prevention members are electrically connected to at least two of the upper circuit board, the lower circuit board, the upper security partition, and the lower security partition.

The anti-tampering prevention member may be conductive rubber exhibiting conductivity and elasticity.

The security unit may be a central processing unit processing data or a storage medium storing data.

The denying of the data of the security unit may be erasing predetermined data.

In order to protect the security unit, the security partition may be provided in a closed type of encompassing an entire perimeter of the security unit or in an open type of encompassing a perimeter of the security unit with a part of the security partition opened.

In order to protect a connection socket, the security partition may be provided in a closed type of encompassing an entire perimeter of the connection socket or in an open type of encompassing a perimeter of the connection socket with a part of the connection socket opened.

According to the exemplary embodiments, leakage of important data may be prevented by denying access to data in a security region when there is a possibility of leakage of the important data to the outside, for example, not only when both of an upper casing and a lower casing are opened, but also when opening of a casing is tried.

DETAILED DESCRIPTION

Figure 1:
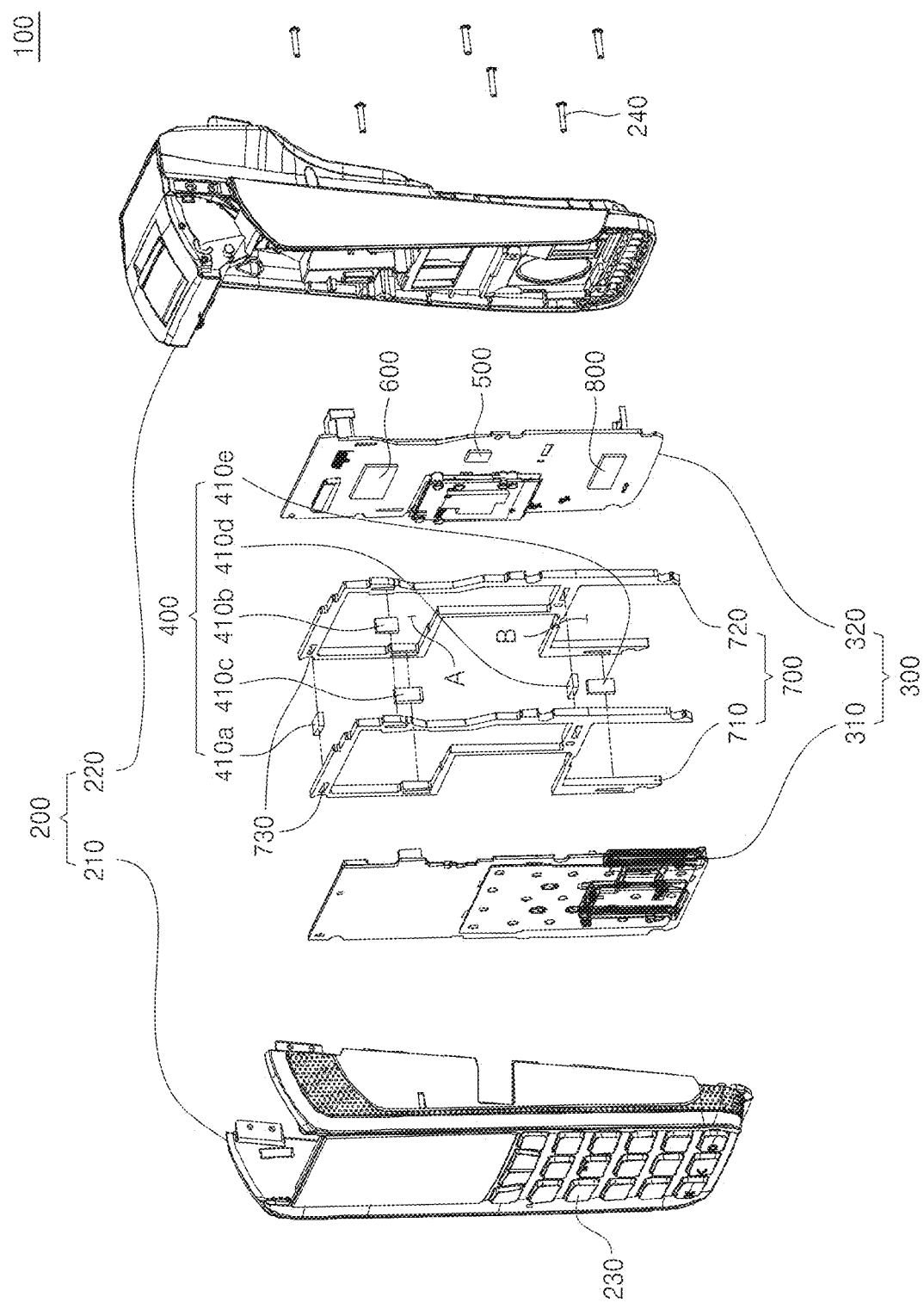
FIG. 1 is an exploded perspective view of a mobile terminal provided with a security function according to an exemplary embodiment.

The attached drawings for illustrating preferred embodiments of the present inventive concept are referred to in order to gain a sufficient understanding of the present inventive concept, the merits thereof, and the objectives accomplished by the implementation of the present inventive concept.

Hereinafter, the present inventive concept will be described in detail by explaining preferred embodiments of the inventive concept with reference to the attached drawings. Like reference numerals in the drawings denote like elements.

Among the terms used in the present specification, the term "tamper" signifies opening a casing by an external force.

Figure 2:
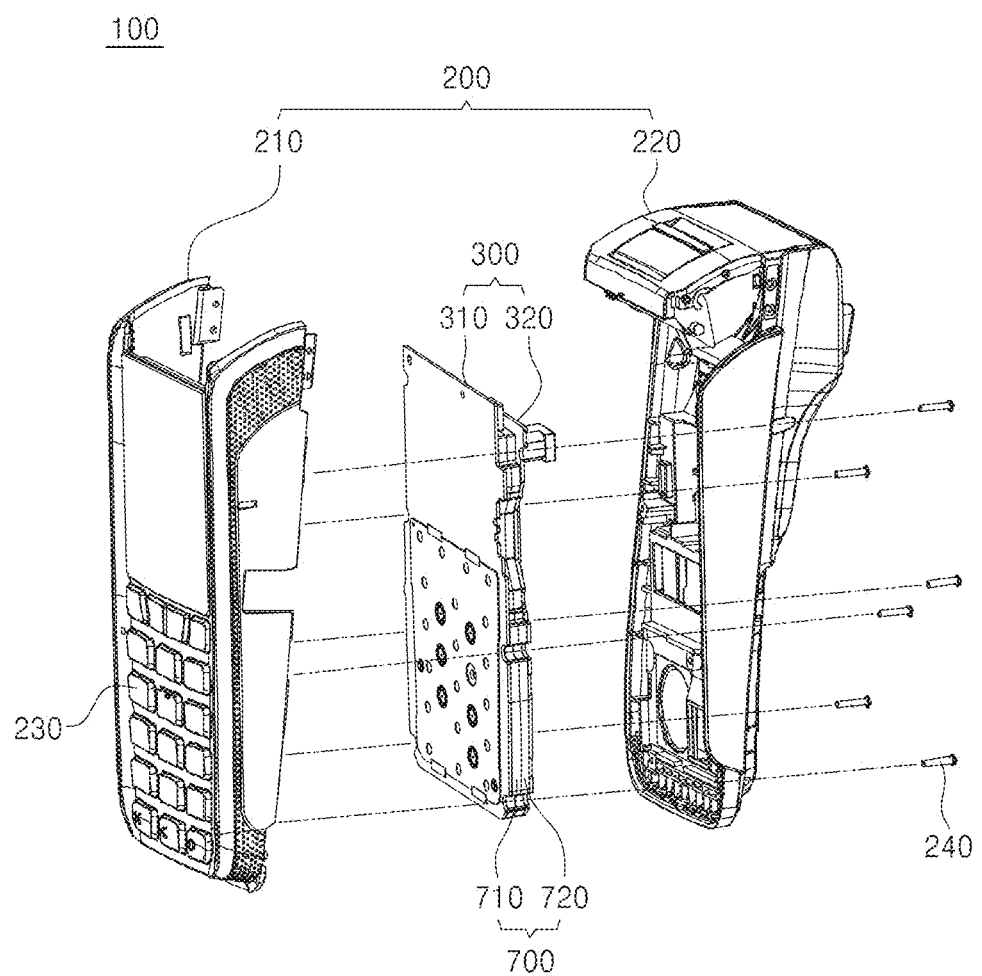
FIG. 2 is a coupled perspective view of a circuit board in a mobile terminal provided with a security function according to an exemplary embodiment.
Figure 3:
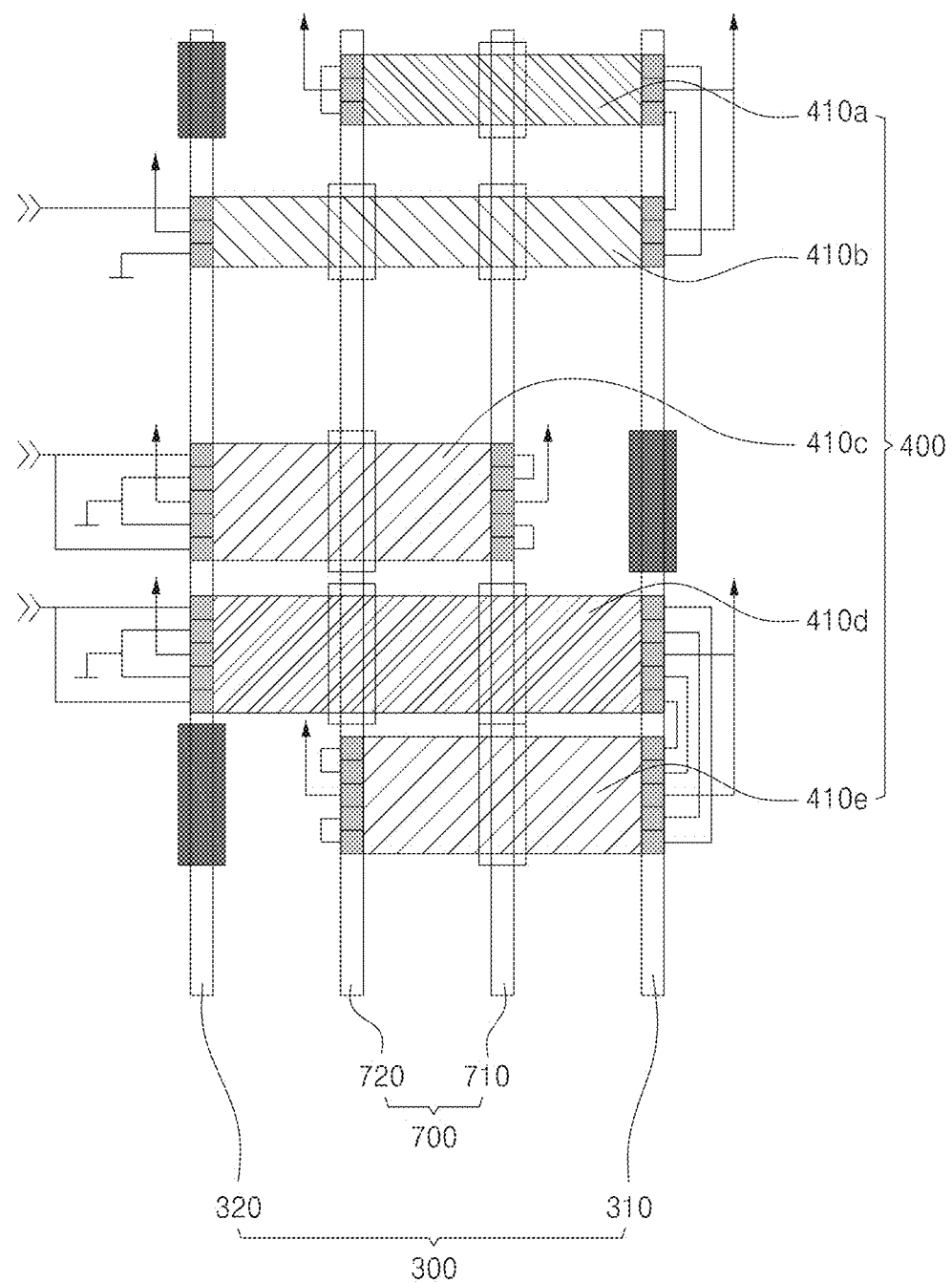
FIG. 3 illustrates connection of an anti-tampering conduction portion in a mobile terminal provided with a security function according to an exemplary embodiment.

FIG. 1 is an exploded perspective view of a mobile terminal provided with a security function according to an exemplary embodiment. FIG. 2 is a coupled perspective view of a circuit board in a mobile terminal provided with a security function according to an exemplary embodiment. FIG. 3 illustrates connection of an anti-tampering conduction portion in a mobile terminal provided with a security function according to an exemplary embodiment.

As illustrated in the drawings, the mobile terminal provided with a security function according to the present exemplary embodiment includes a casing 200, a circuit board 300, an anti-tampering conduction portion 400, and a control portion 500.

Referring to FIGS. 1 and 2, the casing 200 includes a data input portion 230 provided at one side for inputting a predetermined data. The casing 200 includes an upper casing 210 and a lower casing 220 so as to be assembled or disassembled with respect to each other.

The data input portion 230 has a physical input key so as to be electrically connected to the circuit board 300 or may be provided as a touch screen type.

The upper casing 210 and the lower casing 220 may be connected to each other by means of a coupling member 240 such as a screw or a bolt.

An opening into which a screw or bolt may be inserted is formed in the lower casing 220. A coupling portion to which the screw or bolt may be coupled is formed in the upper casing 210. The coupling member 240 such as a screw or bolt inserted into the opening of the lower casing 220 may be coupled to the coupling portion of the upper casing 210 by penetrating through the lower casing 220 and the upper casing 210.

Alternatively, the coupling portion may be formed in the lower casing 220 and the opening into which a screw or bolt is inserted may be formed in the upper casing 210.

Referring to FIGS. 1 and 2, the circuit board 300 is arranged inside the casing 200 and electrically connected to the data input portion 230 to process a signal input through the data input portion 230 and output a result corresponding to the input signal through an output portion.

Also, the circuit board 300 may include a security unit 600 that includes a central processing unit for processing input data and a storage medium such as a memory for storing data.

The central processing unit of the security unit 600 may process data that requires prevention of leakage to the outside. The data requiring prevention of leakage to the outside may be stored in the storage medium of the security unit 600.

Alternatively, the circuit board 300 may include a lower circuit board 320 and an upper circuit board 310. The lower circuit board 320 is arranged above the lower casing 220. The upper circuit board 310 is arranged under the upper casing 210 and above the lower circuit board 320.

When the circuit board 300 includes the upper circuit board 310 and the lower circuit board 320, an input key may be connected to the upper circuit board 310 and the lower circuit board 320 may include the central processing unit, various storage media, or a communication unit.

The anti-tampering conduction portion 400 which is described later may be arranged between the upper circuit board 310 and the lower circuit board 320 and connected to at least one of the upper circuit board 310 and the lower circuit board 320.

In other words, the anti-tampering conduction portion 400 may be connected to one of the upper circuit board 310 and the lower circuit board 320 to be pressed by the casing 200, or connected to both of the upper circuit board 310 and the lower circuit board 320 to be pressed by the casing 200.

Referring to FIG. 1, in the present exemplary embodiment, the anti-tampering conduction portion 400 is arranged between the upper circuit board 310 and the lower circuit board 320 to be pressed.

In other words, when the upper casing 210 and the lower casing 220 forming the casing 200 are assembled, the anti-tampering conduction portion 400 is pressed by the coupling member 240 penetrating through the upper casing 210 and the lower casing 220, to be electrically connected to the circuit board 300.

In other words, after the anti-tampering conduction portion 400 is arranged between the casing 200 and the circuit board 300, the upper casing 210 and the lower casing 220 are coupled to each other by using a screw or bolt that penetrates through the upper casing 210 and the lower casing 220.

When the upper casing 210 and the lower casing 220 are coupled by using the coupling member 240 such as a screw or bolt, the upper circuit board 310 and the lower circuit board 320 press the anti-tampering conduction portion 400 and the anti-tampering conduction portion 400 may thereby be electrically connected to the circuit board 300.

An anti-tampering prevention member 410 may be formed of conductive rubber exhibiting conductivity and elasticity and in which a resistance value between the anti-tampering prevention member 410 and the circuit board 300 to which the anti-tampering prevention member 410 is electrically connected varies according to a change in a degree of compression.

Alternatively, when a degree of pressing of the upper casing 210 and the lower casing 220 decreases, a degree of pressing between the anti-tampering conduction portion 400 and the circuit board 300 changes and thus the resistance value between the anti-tampering conduction portion 400 and the circuit board 300 changes.

In other words, when the screw or bolt coupled to the upper casing 210 and the lower casing 220 is rotated to release the coupling, a change occurs in the degree of pressing by the casing 200 against the anti-tampering conduction portion 400. The resistance value between the anti-tampering conduction portion 400 and the circuit board 300 is changed according to the change in the amount of compression of the anti-tampering conduction portion 400.

When the resistance value of the anti-tampering conduction portion 400 is changed by an external force, the control portion 500 denies access to data of the security unit 600, for example, by erasing preset data.

In detail, the control portion 500 presets the resistance value between the anti-tampering conduction portion 400 and the circuit board 300. When the resistance value goes out of a preset range due to application of an external force, the control portion 500 may determine that there is an external access to the data of the security unit 600 and may deny the access to the data of the security unit 600, for example, by erasing the data.

In other words, when an external force is applied to open the casing 200, the resistance value between the anti-tampering conduction portion 400 and the circuit board 300 is changed. In this case, the control portion 500 may transmit a signal to the security unit 600 to deny the access to the data of the security unit 600.

Alternatively, when the casing 200 is opened by the external force, in other words, the electric connection between the anti-tampering conduction portion 400 and the circuit board 300 is disconnected, the resistance value between the anti-tampering conduction portion 400 and the circuit board 300 becomes infinity. In this case, the control portion 500 may determine that there is an external access to the data of the security unit 600 and deny the access to the data of the security unit 600, for example, by erasing the data.

The security unit 600 may include a central processing unit (CPU) for processing data or a storage medium including various memories for storing data.

In other words, when the casing 200 is to be opened by an external force or is opened, an access to the data being operated by the central processing unit or the data stored in the storage medium in the casing 200 is denied.

The denying of accessing to the data of the security unit 600 may be erasing of predetermined data.

In other words, although all pieces of data may be erased, materials related to security or data that may be prevented from being leaked to the outside may be previously determined and set and then, when an external access as described above is detected, only the predetermined data is erased.

Alternatively, the control portion 500 may be arranged on the circuit board 300 or the control portion 500 may be separated arranged to be connected to the circuit board 300.

Referring to FIG. 1, a mobile terminal 100 provided with a security function according to an exemplary embodiment may further include a security partition 700.

The security partition 700 is arranged between the upper circuit board 310 and the lower circuit board 320 to be connected to the upper circuit board 310 and the lower circuit board 320, and may be electrically connected to the anti-tampering conduction portion 400.

The mobile terminal 100 provided with a security function may deny the access to the data of the security unit 600 for a case of accessing to the data of the security unit 600 not only through the upper or lower side of the casing 200, but also through a side portion of the casing 200.

In other words, when the anti-tampering conduction portion 400 is electrically connected to the security partition 700, and an external force acts through the side portion so that the resistance value between the anti-tampering conduction portion 400 and the security partition 700 is changed as described above, the access to the data of the security unit 600 may be denied.

Referring to FIG. 1, an accommodation opening 730 may be formed in the security partition 700. The anti-tampering conduction portion 400 may be stably supported after being accommodated in the accommodation opening 730 formed in the security partition 700.

When multiple anti-tampering conduction portions 400 are provided, a corresponding number of accommodation openings 730 may be provided.

Alternatively, referring to FIGS. 1 and 2, the security partition 700 may include an upper security partition 710 and a lower security partition 720.

The lower security partition 720 is connected to an upper portion of the lower circuit board 320. The upper security partition 710 is arranged above the lower security partition 720 to be connected to the upper circuit board 310.

While connected to each of the upper circuit board 310 and the lower circuit board 320, the anti-tampering conduction portion 400 may be electrically connected to at least one of the upper security partition 710 and the lower security partition 720.

In other words, one end of the anti-tampering conduction portion 400 is connected to the upper circuit board 310 and the other end thereof is connected to the lower circuit board 320. Thus, the anti-tampering conduction portion 400 is connected to both of the upper circuit board 310 and the lower circuit board 320.

Although the anti-tampering conduction portion 400 penetrates through both of the upper security partition 710 and the lower security partition 720 to be electrically connected to the upper circuit board 310 and the lower circuit board 320, the anti-tampering conduction portion 400 is not necessarily electrically connected to both of the upper security partition 710 and the lower security partition 720 and may be electrically connected to any one of the upper security partition 710 and the lower security partition 720 as necessary.

As such, according to the mobile terminal 100 provided with a security function according to the present exemplary embodiment, the anti-tampering conduction portion 400, the upper security partition 710, and the lower security partition 720 are connected to one another in various methods. Access to the data of the security unit 600 from various directions, that is, the access to the data of the security unit 600 through the upper, lower, or side portion, may be accurately detected.

Also, referring to FIG. 3, when the security partition 700 includes the lower security partition 720 and the upper security partition 710, the anti-tampering conduction portion 400 may include a plurality of the anti-tampering prevention members 410. The anti-tampering prevention members 410 may be separated from one another.

In other words, in order to more clearly detect the access to the data of the security unit 600 tried through various parts of the casing 200, the anti-tampering conduction portion 400 is provided in a multiple number and arranged at various positions between the upper circuit board 310 and the lower circuit board 320.

Each of the anti-tampering prevention members 410 may be electrically connected to at least two of the upper circuit board 310, the lower circuit board 320, the upper security partition 710, and the lower security partition 720.

In other words, referring to FIG. 3, a first anti-tampering prevention member 410a is connected to the lower security partition 720 by penetrating through the upper circuit board 310 and the upper security partition 710.

In this case, the first anti-tampering prevention member 410a may be electrically connected to all of the upper circuit board 310, the upper security partition 710, and the lower security partition 720, or the first anti-tampering prevention member 410a may be electrically connected to only the upper circuit board 310 and the lower security partition 720, not to the upper security partition 710.

A second anti-tampering prevention member 410b may be connected from the upper circuit board 310 to the lower circuit board 320 by penetrating through the upper security partition 710 and the lower security partition 720.

In this case, the second anti-tampering prevention member 410b may be electrically connected to all of the upper circuit board 310, the upper security partition 710, the lower security partition 720, and the lower circuit board 320, to only the upper circuit board 310 and the lower circuit board 320, or to only the upper circuit board 310 and the lower circuit board 320 and to at least one of the upper security partition 710 and the lower security partition 720.

Also, as described above, the anti-tampering prevention members 410a, 410b, 410c, 410d, and 410e may be electrically connected in a variety of combinations as necessary, and the access to the data of the security unit 600 through various parts may be denied.

In other words, by electrically combining the anti-tampering prevention member 410a, 410b, 410c, 410d, and 410e in various methods, important data may be prevented from being leaked to the outside by opening or trying to open the casing 200 through various routes.

Alternatively, to protect the security unit 600 provided as the central processing unit for processing data or the storage medium for sorting data, the security partition 700 may be formed in a shape of encompassing the security unit 600 in a closed type or an open type.

In other words, for a closed type, the security partition 700 is provided to encompass the entire perimeter of the security unit 600. For an open type, the security partition 700 is provided to encompass the perimeter of the security unit 600 with a part of the security partition 700 opened.

As illustrated in FIG. 1, the security partition 700 may be provided to encompass the security unit 600 in a closed type A.

In other words, since the central processing unit and the storage medium are where important data is processed and stored, a physical shock transferred to the security unit 600 from the outside may be prevented by the security partition 700 that encompasses the security unit 600.

Also, to protect a connection socket 800 arranged inside the casing 200, the security partition 700 may be formed in a shape of encompassing the connection socket 800 in a closed type or open type.

In the connection socket 800, like the security unit 600, for a closed type, the security partition 700 is provided to encompass the entire perimeter of the connection socket 800 and, for an open type, the security partition 700 is provided to encompass the perimeter of the connection socket 800 in a state in which a part of the security partition 700 is open.

As illustrated in FIG. 1, the security partition 700 may be provided to encompass the connection socket 800 in an open type B.

Alternatively, when the resistance value of the anti-tampering conduction portion 400 is out of a preset range, or the resistance value of the anti-tampering conduction portion 400 becomes infinite, thereby disconnecting the electric connection between the anti-tampering conduction portion 400 and the circuit board 300, the mobile terminal 100 provided with a security function according to an exemplary embodiment may be capable of generating alarm sound.

The operation and effect of the mobile terminal 100 provided with a security function according to the exemplary embodiment are described below.

First, referring to FIGS. 1 and 2, the upper circuit board 310 and the lower circuit board 320 are arranged between the upper casing 210 and the lower casing 220. The anti-tampering prevention members 410 are arranged between the upper circuit board 310 and the lower circuit board 320. The anti-tampering prevention members 410 are pressed by the coupling member 240 that penetrates through the upper casing 210 and the lower casing 220.

The upper security partition 710 connected to the upper circuit board 310 and the lower security partition 720 connected to the lower circuit board 320 may be arranged between the upper circuit board 310 and the lower circuit board 320.

The anti-tampering conduction portion 400 may be supported by being inserted into the accommodation opening 730 formed in the upper security partition 710 and the lower security partition 720.

The anti-tampering conduction portion 400 is electrically connected to at least two of the upper circuit board 310, the lower circuit board 320, the upper security partition 710, and the lower security partition 720. When access to or an attempt to access to the data of the security unit 600, for example, opening or trying to open the casing 200 by an external force, occurs, access to the data of the security unit 600 is denied by erasing preset important data. As a result, leakage of important data to the outside may be prevented.

While this inventive concept has been particularly shown and described with reference to preferred embodiments thereof, it will be understood by those of ordinary skill in the art that various changes in form and details may be made therein without departing from the spirit and scope of the inventive concept as defined by the appended claims. Therefore, the scope of the inventive concept is defined not by the detailed description of the inventive concept but by the appended claims, and all differences within the scope will be construed as being included in the present inventive concept.

INDUSTRIAL APPLICABILITY

The present inventive concept is applicable to mobile communication terminals, payment terminals, and various computers and tablet PCs, and particularly, to the payment terminal industry.

The invention claimed is:

1. A mobile terminal provided with a security function, the mobile terminal comprising:
a casing comprising a data input portion for inputting data and an upper casing part and a lower casing part which are capable of being assembled or disassembled with respect to each other;
a circuit board comprising a security unit that is electrically connected to the data input portion and is configured to process input data;
an anti-tampering conduction portion arranged between the casing and the circuit board and electrically connected to the circuit board by being pressed when the upper casing part and the lower casing part are assembled to each other;
a control portion denying access to data of the security unit based on a resistance value of the anti-tampering conduction portion; and
a security partition configured to encompass the security unit to deny access to the data of the security unit from a side portion of the casing,
wherein the anti-tampering conduction portion is electrically connected to the security partition.

2. The mobile terminal provided with a security function of claim 1, wherein the anti-tampering conduction portion is pressed by a coupling member that penetrates through the upper casing part and the lower casing part.

3. The mobile terminal provided with a security function of claim 1, wherein, when a resistance value between the anti-tampering conduction portion and the circuit board is out of a preset range, the control portion denies access to the data of the security unit.

4. The mobile terminal provided with a security function of claim 1, wherein, when the resistance value between the anti-tampering conduction portion and the circuit board is infinite and an electric connection between the anti-tampering conduction portion and the circuit board is disconnected, the control portion denies access to the data of the security unit.

5. The mobile terminal provided with a security function of claim 1, wherein the circuit board comprises a lower circuit board arranged above the lower casing part and an upper circuit board arranged above the lower circuit board and the anti-tampering conduction portion is arranged between the upper circuit board and the lower circuit board and connected to at least one of the upper circuit board and the lower circuit board.

6. The mobile terminal provided with a security function of claim 5, wherein the security partition is arranged between the upper circuit board and the lower circuit board and is connected to each of the upper circuit board and the lower circuit board.

7. The mobile terminal provided with a security function of claim 6, wherein an accommodation opening for accommodating the anti-tampering conduction portion is formed in the security partition.

8. The mobile terminal provided with a security function of claim 6, wherein the anti-tampering conduction portion is connected to each of the upper circuit board and the lower circuit board,
the security partition comprises a lower security partition connected to the lower circuit board and an upper security partition arranged above the lower security partition and connected to the upper circuit board, and
the anti-tampering conduction portion is electrically connected to at least one of the upper security partition and the lower security partition.

9. The mobile terminal provided with a security function of claim 6, wherein the security partition comprises a lower security partition connected to the lower circuit board and an upper security partition arranged above the lower security partition and connected to the upper circuit board, and
wherein the anti-tampering conduction portion comprises a plurality of anti-tampering prevention members separated from one another, each of the plurality of anti-tampering prevention members being electrically connected to at least two of the upper circuit board, the lower circuit board, the upper security partition, and the lower security partition.

10. The mobile terminal provided with a security function of claim 9, wherein each anti-tampering prevention member is conductive rubber exhibiting conductivity and elasticity.

11. The mobile terminal provided with a security function of claim 6, wherein, in order to protect the security unit, the security partition is provided in a closed type of encompassing an entire perimeter of the security unit or in an open type of encompassing a perimeter of the security unit with a part of the security partition opened.

12. The mobile terminal provided with a security function of claim 6, wherein, in order to protect a connection socket, the security partition is provided in a closed type of encompassing an entire perimeter of the connection socket or in an open type of encompassing a perimeter of the connection socket with a part of the connection socket opened.

13. The mobile terminal provided with a security function of claim 1, wherein the security unit is a central processing unit processing data or a storage medium storing data.

14. The mobile terminal provided with a security function of claim 1, wherein the denying of access to data of the security unit is erasing predetermined data.

* * * * *